United States Patent Office 3,219,667
Patented Nov. 23, 1965

---

3,219,667
PIPERIDYLETHYL SULFONIC ACIDS
Francis E. Cislak and William H. Rieger, Indianapolis, Ind., assignors to Reilly Tar & Chemical Corporation, Indianapolis, Ind., a corporation of Indiana
No Drawing. Filed July 2, 1963, Ser. No. 292,456
6 Claims. (Cl. 260—293.4)

This invention relates to a new class of chemical compounds and to the process of preparing them.

The new class of organic compounds which are the subject matter of our present invention are piperidylethyl sulfonic acids and their salts. Our new piperidine ethyl sulfonic acids have the following general formula:

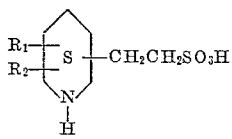

wherein $R_1$ and $R_2$ represent hydrogen or lower alkyl.

In general our new class of compounds may be prepared by the hydrogenation of a pyridylethylsulfonic acid or of a salt of a pyridylethylsulfonic acid.

Our invention will be described more fully in conjunction with the following examples. It should be understood, however, that these examples are given by way of illustration only and that our invention is not to be limited by the details set forth therein.

*Example 1.—4-piperidylethylsulfonic acid*

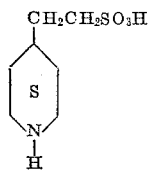

Into a one-liter rocking type hydrogenation autoclave is placed a solution consisting of 37.4 grams of 4-pyridylethyl sulfonic acid, 50 grams of water, and 350 grams of glacial acetic acid. To this solution is added 2.0 grams of a platinum oxide hydrogenation catalyst. The autoclave is sealed. After sweeping out all the air with hydrogen, the vessel is pressurized with hydrogen and the temperature gradually raised to about 75° C. Then the autoclave is rocked, and the hydrogenation proceeds. The hydrogen pressure is maintained at from about 1600 to 1800 p.s.i.g. The temperature of the reaction mixture is maintained within the range of about 75–100° C. The theoretical amount of hydrogen is absorbed within about one hour.

Now the vessel is allowed to cool to room temperature. The residual hydrogen is released and the contents of the autoclave poured into a beaker. The catalyst is separated from the solution by filtration.

The filtrate contains the 4-piperidylethyl sulfonic acid which was formed during the hydrogenation. The solvent, water and acetic acid, is removed by evaporation. The residue consists of crystalline 4-piperidylethyl sulfonic acid. To remove any trace of acetic acid adhering to the crystals, they are washed with isopropanol and then dried in the oven.

The yield of 4-piperidylethylsulfonic acid is essentially quantitative.

The 4-piperidylethyl sulfonic acid is a white crystalline salt-like solid. It is freely soluble in water but is insoluble in hydrocarbon solvents. It forms salts with alkali metal hydroxides.

The 4-pyridylethylsulfonic acid used to make the 4-piperidylethyl sulfonic acid is prepared in accordance with the procedure of U. S. Patent No. 2,508,904 issued May 23, 1950.

*Example 2.—Sodium 2-piperidylethyl sulfonate*

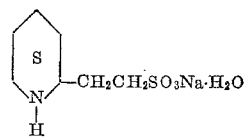

1,000 ml. of an aqueous solution of 418 grams of the sodium salt of 2-pyridylethyl sulfonic acid is stirred at room temperature for about two hours with 20 grams of Raney nickel catalyst. Then the catalyst is separated from the solution by filtration.

The resulting filtrate is placed into a two-liter rocking type hydrogenation autoclave and to it is added 20 grams of Raney nickel hydrogenation cataylst. The autoclave is sealed. After sweeping out all the air with hydrogen, the vessel is pressurized with hydrogen, the temperature gradually raised to about 75° C., and then the vessel is rocked to cause hydrogenation to proceed. The temperature of the reaction mixture is maintained at about 75°–125° C. The hydrogen pressure is maintained at from about 300 to about 1000 p.s.i.g. The hydrogenation is completed in about seven hours. The course of the hydrogenation may be followed by sampling the reaction mixture and titrating the sample with standardized acid. Then the reaction vessel is cooled to room temperature, the hydrogen pressure released, and the contents poured into a beaker.

The catalyst is separated from the solution by filtration. The filtrate contains the sodium salt of the 2-piperidylethyl sulfonic acid formed during the hydrogenation.

Evaporation of the water from the filtrate leaves a colorless solid which is the monohydrate of sodium 2-piperidylethyl sulfonate. The sodium 2-piperidylethyl sulfonate reacts with acid to form amine salts. Titration with hydrochloric acid may be used in assaying the sulfonate.

The sodium salt of 2-piperidylethyl sulfonic acid is useful in the preparation of detergents by reaction with fatty acid chlorides as described in co-pending U.S. Patent application Serial No. 259,444 filed February 18, 1963.

In place of the sodium salt of 2-pyridylethyl sulfonic acid we may use other metallic salts, such for instance, as the potassium salt.

*Example 3.—2-piperidylethyl sulfonic acid*

The procedure of Example 1 is repeated with the exception that 2-pyridylethyl sulfonic acid is used in place of the 4-pyridylethyl sulfonic acid.

Refluxing 2-piperidylethyl sulfonic acid with acetic anhydride gives N-acetyl-2-piperidylethyl sulfonic acid which has a melting point of about 196–199° C.

*Example 4.—Sodium 5-ethyl-2-piperidylethyl sulfonate*

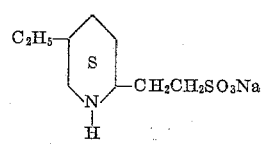

The procedure of Example 2 is repeated with the exception that 474 grams of sodium 5-ethyl-2-pyridylethyl sulfonate is used in place of the 418 grams of sodium 2-pyridylethyl sulfonate.

*Example 5.—3-piperidylethyl sulfonic acid*

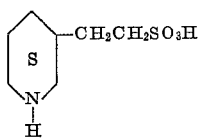

The procedure of Example 1 is repeated with the exception that 3-pyridylethyl sulfonic acid is used in place of the 4-pyridylethyl sulfonic acid.

*Example 6.—3-ethyl-4-piperidylethyl sulfonic acid*

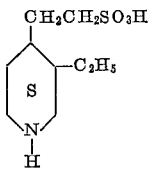

The procedure of Example 1 is repeated with the exception that 43 grams of 3-ethyl-4-pyridylethyl sulfonic acid is used in place of the 37.4 grams of 4-pyridylethyl sulfonic acid.

*Example 7.—Sodium 3-ethyl-2-piperidylethyl sulfonate*

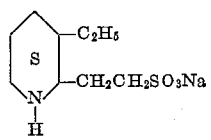

The procedure of Example 4 is repeated with the exception that sodium 3-ethyl-2-pyridylethyl sulfonate is used in place of the sodium 5-ethyl-2-pyridylethyl sulfonate.

*Example 8.—5-methyl-2-piperidylethyl sulfonic acid*

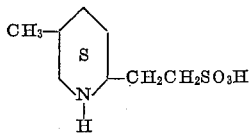

The procedure of Example 1 is repeated with the exception that 40.2 grams of 5-methyl-2-pyridylethyl sulfonic acid is used in place of the 37.4 grams of 4-pyridyl ethyl sulfonic acid.

*Example 9.—2-methyl-5-piperidylethyl sulfonic acid*

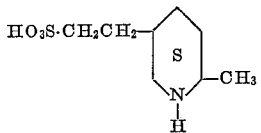

The procedure of Example 1 is repeated with the exception that 40.2 grams of 2-methyl-5-pyridylethyl sulfonic acid is used in place of the 37.4 grams of 4-pyridylethyl sulfonic acid.

*Example 10.—6-methyl-2-piperidylethyl sulfonic acid*

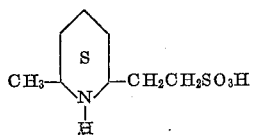

The procedure of Example 1 is repeated with the exception that 40.2 grams of 6-methyl-2-pyridylethyl sulfonic acid is used in place of the 37.4 grams of 4-pyridylethyl sulfonic acid.

In their molecular make-up, our piperidylethyl sulfonic acids have a strongly acid group, $-SO_3H$, and also a strongly basic group, $=NH$. They can be reacted with, say, caustic soda and then with, say, hydrochloric acid.

Our piperidylethyl sulfonic acids are useful as starting materials in the preparation of fatty acid-amide detergents.

We claim as our invention:

1. Compounds of the class consisting of piperidylethyl sulfonic acids and their alkali metal salts, which piperidylethyl sulfonic acids have the formula:

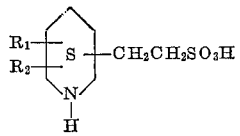

wherein $R_1$ and $R_2$ are selected from the class consisting of hydrogen and lower alkyl.

2. The compound 2-piperidylethyl sulfonic acid having the formula:

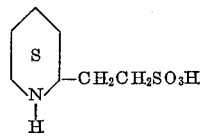

3. The compound 4-piperidylethyl sulfonic acid having the formula:

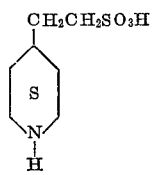

4. The compound 2-methyl-5-piperidylethyl sulfonic acid having the formula:

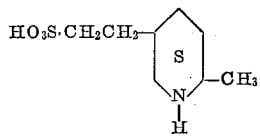

5. The compound 5-ethyl-2-piperidylethyl sulfonic acid having the formula:

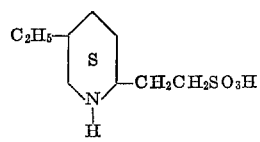

6. The compound 6-methyl-2-piperidylethyl sulfonic acid having the formula:

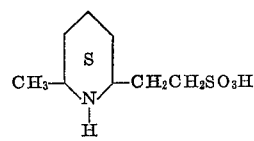

References Cited by the Examiner

UNITED STATES PATENTS 2,675,390  4/1954  Rosenblatt _____ 260—293.2
2,802,007  8/1957  Biel _____ 260—293.2

OTHER REFERENCES

Lambert et al., Journ. Chem. Soc. (London), pages 46–9 (1949).

WALTER A. MODANCE, *Primary Examiner.*

NICHOLAS RIZZO, *Examiner.*